United States Patent [19]

Kurtti

[11] Patent Number: 4,570,873
[45] Date of Patent: Feb. 18, 1986

[54] SENSOR SENSITIVITY REDUCER FOR DOOR MOUNTED RETRACTOR

[75] Inventor: Gary R. Kurtti, East Detroit, Mich.

[73] Assignee: General Motors Corporation, Detroit, Mich.

[21] Appl. No.: 690,739

[22] Filed: Jan. 11, 1985

[51] Int. Cl.⁴ .................. A62B 35/02; B65H 75/48
[52] U.S. Cl. ................. 242/107.4 A; 242/107.4 D; 280/803; 280/806
[58] Field of Search ............... 242/107.4 A, 107.4 D; 280/806, 803; 297/478, 480

[56] References Cited

U.S. PATENT DOCUMENTS

| | | | |
|---|---|---|---|
| 3,741,495 | 6/1973 | Takada | 242/107.4 D |
| 3,741,496 | 6/1973 | Beller | 242/107.4 A |
| 4,053,116 | 10/1977 | Takada | 242/107.7 |
| 4,082,236 | 4/1978 | Stephenson et al. | 242/107.4 D X |
| 4,181,326 | 1/1980 | Hollowell et al. | 242/107.4 A X |
| 4,209,186 | 6/1980 | Close | 242/107.4 A X |
| 4,244,600 | 1/1981 | Takada | 242/107.4 A |
| 4,293,105 | 10/1981 | Weman | 242/107.4 B |
| 4,492,349 | 1/1985 | Stamboulian | 242/107.4 A |

Primary Examiner—John M. Jillions
Attorney, Agent, or Firm—Charles E. Leahy

[57] ABSTRACT

A retractor mounted on the vehicle door in a passive belt system includes an inertia mass which lifts a pilot pawl into engagement with one of a plurality of gear teeth carried by the reel so that an initial unwinding rotation of the reel as the occupant is restrained by the belt causes the tooth to further lift the pilot pawl into engagement with the lock bar and then lift the lock bar into engagement with the reel. A blocking arm is friction drive coupled to the reel for rotation therewith and has an end which frictionally engages the pilot pawl during belt unwinding rotation induced by opening movement of the door to impose a frictional force on the pawl which substantially increases the level of acceleration force required to actuate the inertia mass and pilot pawl. As the door is closed, the belt is rewound upon the retractor and the blocking arm is friction driven away from engagement with the pilot pawl so that the pilot pawl is restored to its normal sensitivity condition in readiness for movement into engagement with the gear teeth by the inertia mass in response to a sensed condition of vehicle deceleration.

2 Claims, 4 Drawing Figures

SENSOR SENSITIVITY REDUCER FOR DOOR MOUNTED RETRACTOR

The invention relates to a door mounted seat belt retractor for use in a door mounted passive belt system and functions to decrease the sensitivity of the acceleration locking device.

BACKGROUND OF THE INVENTION

It is known to provide a seat belt system which is connected to the door so that movement of the door between the open and closed positions will automatically move the seat belt between a restraining position about the occupant when the door is closed and a position away from the occupant when the door is open to permit occupant ingress and egress.

The prior art has recognized that such passive seat belt systems may employ a retractor mounted upon the door and having a vehicle inertia sensitive locking mechanism adapted to lock up the retractor in response to the onset of predetermined vehicle acceleration. The prior art has also recognized that a rapid opening movement of the door may cause the retractor to experience a sufficient level of acceleration to lock up the retractor. Accordingly, many prior art patents have disclosed various devices for entirely blocking out or merely desensitizing the inertia locking mechanism in response to actuation of the door latch or in response to sensing a door open condition.

It would be desirable to provide a door mounted seat belt retractor having an associated device for desensitizing the inertia locking mechanism independently of any inter-connection with the door latch or with a sensor for determining the position of the door.

SUMMARY OF THE INVENTION

According to the present invention a retractor mounted on the vehicle door includes a spring biased belt reel for winding one end of a belt having its other end mounted on the vehicle inboard the seat so that the belt will unwind from the reel as the door is being opened. The retractor is locked against belt unwinding rotation by a lock bar pivotally mounted for movement into engagement with the reel. Movement of the lock bar into engagement with the reel is obtained by a pilot pawl supported by an inertia sensing weight which is displaced in response to a deceleration of the vehicle. The inertia weight lifts the pilot pawl into engagement with one of a plurality of gear teeth carried by the reel so that the initial unwinding rotation of the reel as the occupant is restrained by the belt causes the tooth to further lift the pilot pawl into engagement with the lock bar to engage the lock bar with the reel. A blocking arm is friction drive coupled to the reel for rotation therewith and has an end which frictionally engages the pilot pawl during belt unwinding rotation induced by opening movement of the door to impose a frictional force on the pilot pawl which substantially increases the level of acceleration force required to actuate the inertia weight and pilot pawl. As the door is closed, the belt is rewound upon the retractor and the blocking arm is friction driven away from engagement with the pilot pawl so that the pilot pawl is restored to its normal sensitivity condition in readiness for movement into engagement with the gear teeth by the inertia weight in response to sensed condition of vehicle deceleration.

Thus, the object, feature and advantage of the invention resides in the provision of a blocking arm friction coupled with a door mounted seat belt reel for engagement with a lock bar actuating pilot pawl during belt unwinding rotation induced by opening movement of the door whereby the blocking arm frictionally engages with the pilot pawl to desensitize the pilot pawl against actuation by the level of acceleration experienced during opening movement of the door.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
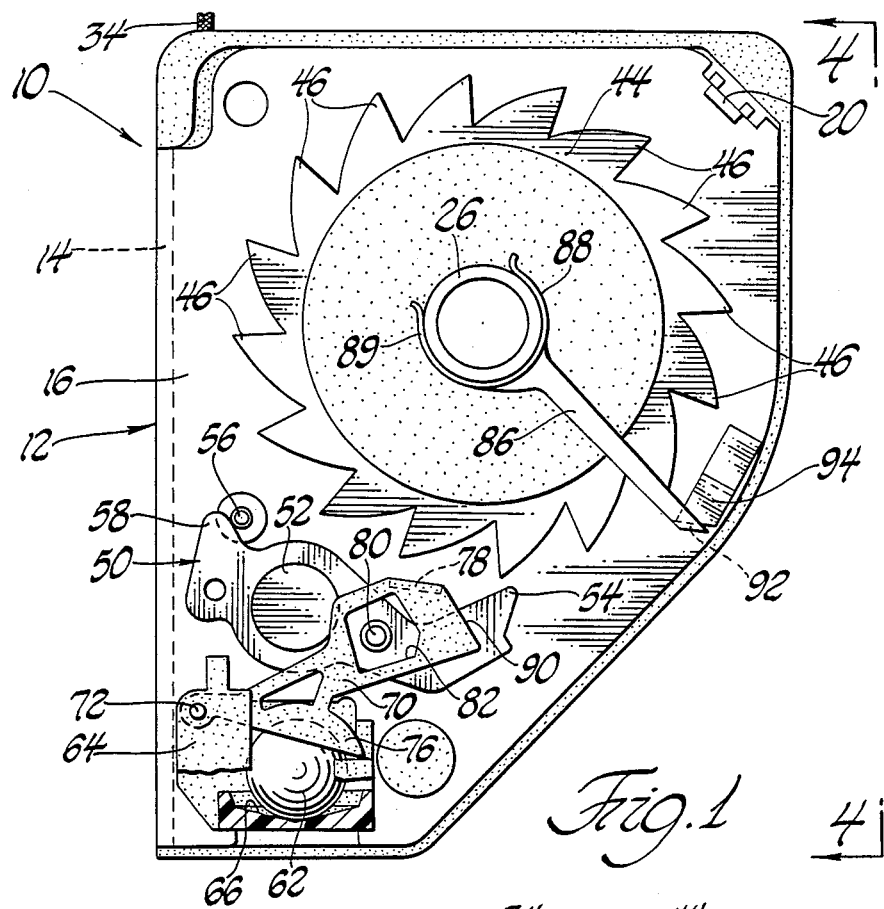
FIG. 1 is a side elevation view of the door mounted seat belt retractor shown in the normal door closed position with the belt fully wound upon the reel and deployed across the occupant torso for restraint.
Figure 4:
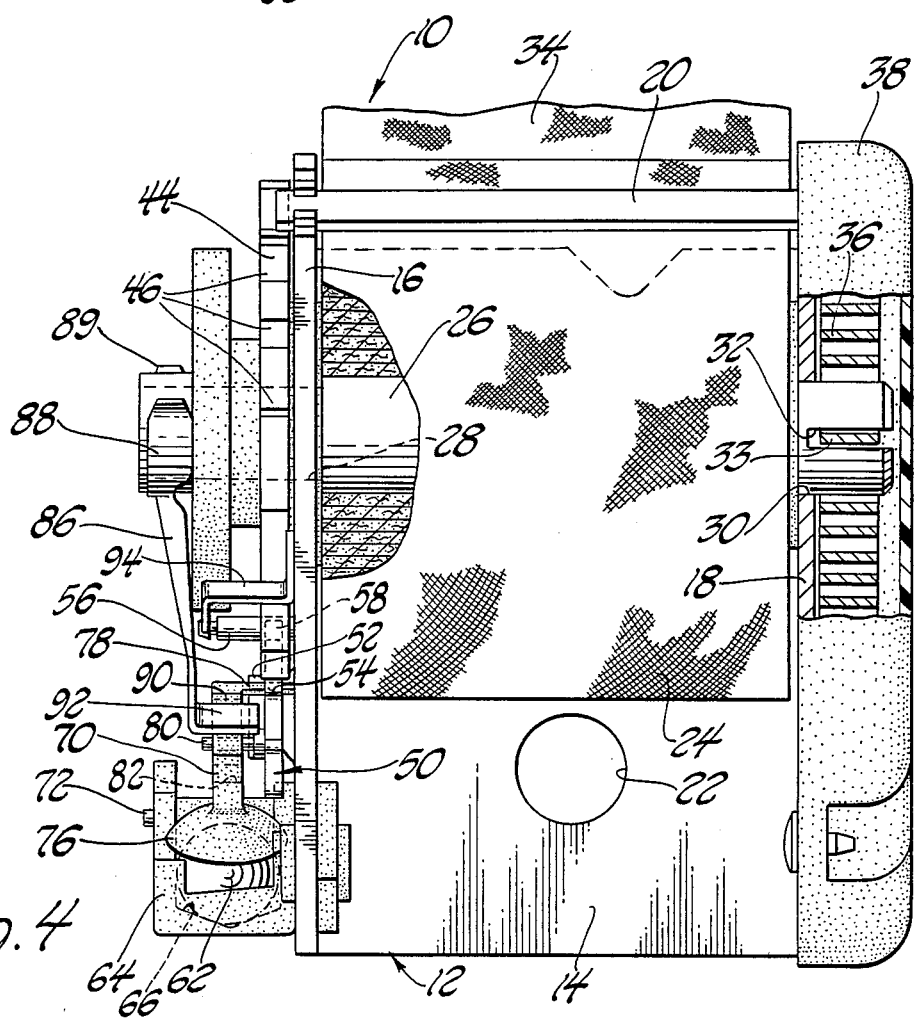
FIG. 4 is a frontal elevation view of the retractor taken in the direction of arrows 4—4 of FIG. 1.

Referring to FIGS. 1 and 4, it is seen that the door mounted retractor indicated generally at 10 includes a frame 12 having a base wall 14 and a pair of laterally spaced apart sidewalls 16 and 18. A tie bar 20 extends between the sidewalls 16 and 18 to strengthen the frame 12. The base wall 14 has an aperture 22 for receiving a bolt to mount the frame 12 on the vehicle door.

As best seen in FIG. 4, a belt reel 24 includes a reel shaft 26 having a left-hand end extending through an aperture 28 in the sidewall 16 and a right-hand end extending through an aperture 30 in the sidewall 18. The restraint belt 34 is suitably attached to the reel shaft 26 and is wound there around.

The right-hand end of the reel shaft 26 has a slot 32 receiving the inner end 33 of a spiral spring 36. The outer end of the spiral spring 36 is suitably attached to a spring cover 38. The spiral spring 36 functions to rotate the reel 24 in the counterclockwise belt winding direction of rotation as viewed in FIG. 1.

A locking mechanism is provided for locking the reel 24 against belt unwinding clockwise rotation. A toothed ratchet plate 44 is suitably attached to the left-hand end of the reel shaft 26 adjacent to the side wall 16 and has a plurality of circumferentially spaced ratchet teeth 46 which face in the belt unwinding direction of rotation. A lock bar 50 is pivotally mounted on the sidewall 16 by a pivot pin 52. Lock bar 50 has a tooth 54 which, upon pivoting counterclockwise rotation, is moved into engagement with one of the ratchet teeth 46 to lock the reel 24 against any further belt unwinding rotation as shown in the phantom-line indicated position of FIG. 2.

The normal rest position of the lock bar 50 is shown in FIG. 1 and is established by a stop pin 56 mounted on the side wall and extending into engagement with the tail portion 58 of the lock bar 50.

Figure 3:
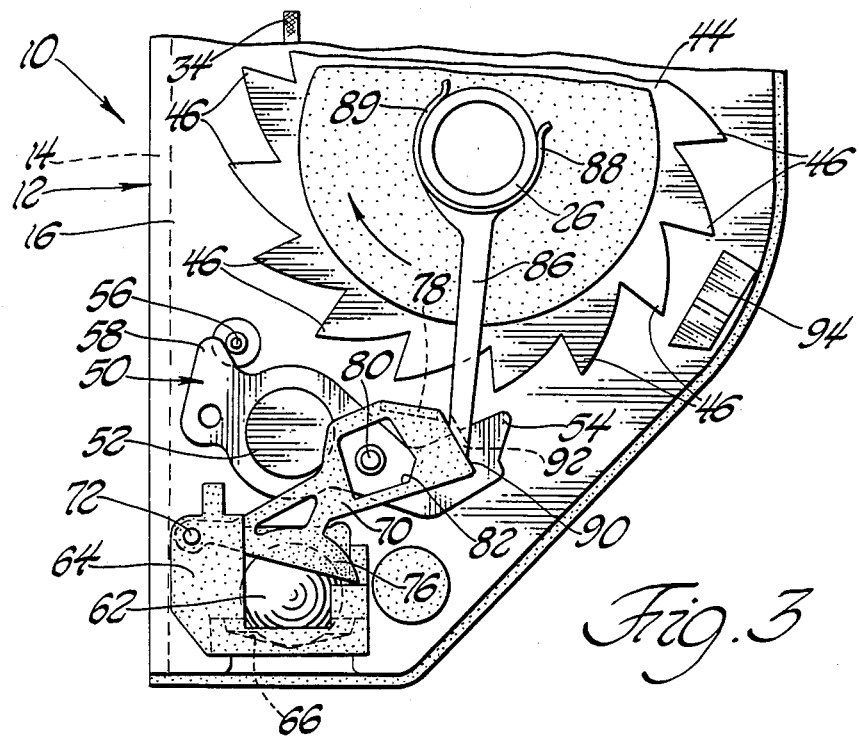
FIG. 3 is a view similar to FIG. 1 but showing the belt being unwound from the reel during opening movement of the vehicle door so that a blocking arm friction drive coupled with the reel engages with the pilot pawl to desensitize the pilot pawl to movement by acceleration of the retractor induced by opening movement of the door.

As best seen in FIGS. 1 and 4, an inertia sensitive ball 62 is mounted upon the sidewall 16 by a cup member 64 having a conical depression 66 in which the ball 62 is seated. The pilot pawl 70 is pivotally mounted upon the cup member 64 by a pivot pin 72 and has a cap 76 which seats upon the inertia ball 62. The pilot pawl 70 also has a tooth 78 which is laterally offset from the pawl 70 as best shown in FIG. 4 so as to underlie the ratchet plate 44 in spaced relation therefrom as shown in FIGS. 1, 3 and 4.

Figure 2:
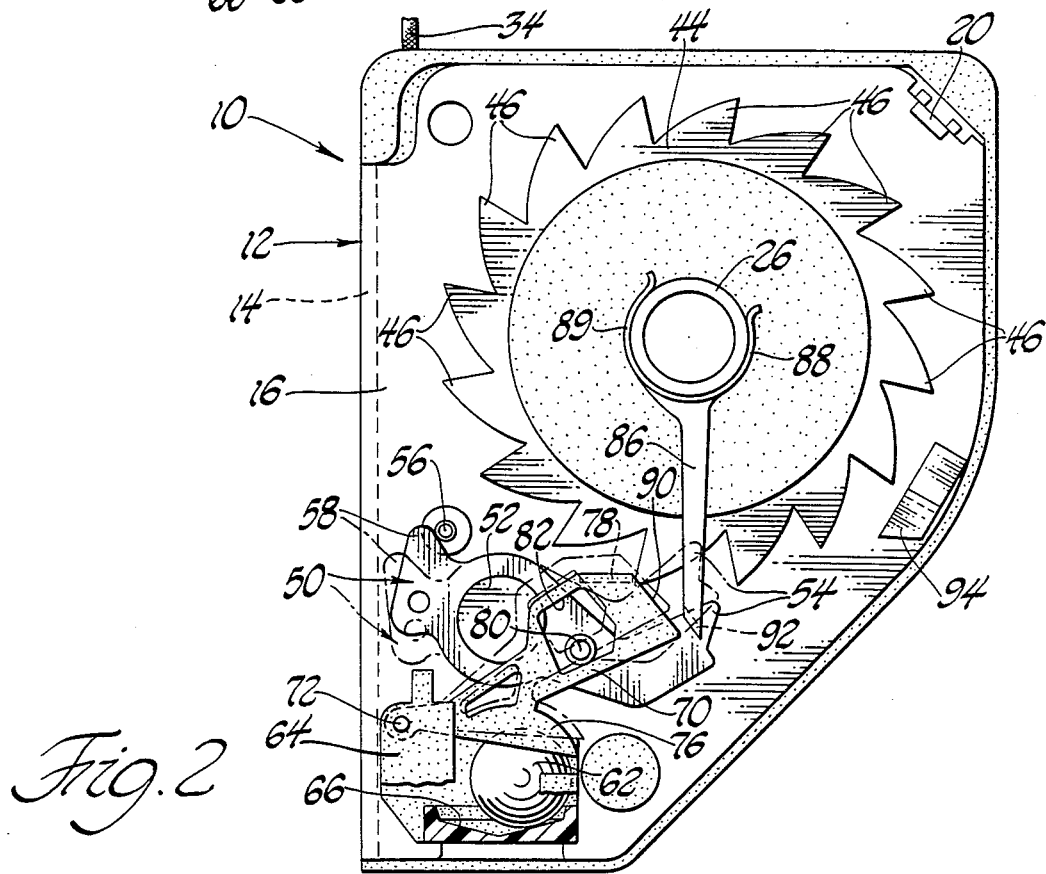
FIG. 2 is a view similar to FIG. 1 but showing the retractor having experienced a vehicle deceleration in which the inertia weight actuates the pilot pawl which, in turn, actuates the lock bar to the phantom line indicated position to lock the reel against belt unwinding rotation.

When the vehicle, including the door upon which the retractor 10 is mounted, experiences a predetermined level of deceleration as occurs in an emergency stop, the inertia of the inertia ball 62 causes it to roll up the conical depression 66 and in so doing, lift the pawl 70 upwardly to the position of FIG. 2 in engagement with the one of the ratchet teeth 46. During such an emergency stop, the momentum of the occupant is restrained by the belt which, in turn, induces a clockwise unwinding rotation of the belt reel so that the engagement of the pilot pawl tooth 78 with the ratchet tooth 46 induces a lifting movement of the lock bar 50 via a pin 80 which is engaged by a wall of a window 82 provided into pilot pawl 70 so that the lock bar 50 is lifted into engagement with the ratchet tooth 46 to stop any further unwinding rotation of the reel.

When the occupant restraint load is relieved from the belt 34, the reel will rewind in a counterclockwise direction so that the teeth 46 are disengaged from the tooth 54 of lock bar 50 and from the tooth 78 of pilot pawl 70. Accordingly, gravity will return the lock bar 50 and the pilot pawl 70 to their normal rest positions of FIG. 1.

It will be understood that when the door is opened by the occupant to enable occupant ingress or egress from the vehicle, the belt will be unwound from the door mounted retractor 10 during such door opening movement. If the door is pushed open rapidly, the retractor may experience a level of acceleration sufficient to cause the inertia ball 62 to roll up the conical depression 66 and initiate the sequence of lifting movement of the pilot pawl 70 into engagement of its tooth 78 with the ratchet plate 44 so that the unwinding rotation of the reel will, in turn, energize the further lifting movement of the pilot pawl 70 to engage the lock bar 50 with the ratchet teeth 46 so that the length of the belt will be locked and further opening movement of the door temporarily prevented.

As best seen in FIGS. 3 and 4, this condition is prevented by a blocking arm 86 which is frictionally drive coupled to the reel 24 for rotation therewith. This friction drive coupling is provided by spaced apart spring arms 88 and 89 of the blocking arm 86 which grip the left-hand end of the reel shaft 26. As best seen in FIG. 4, the end 92 of the blocking arm 86 is laterally offset and extends inwardly for movement through an arc between an angled end face 90 of the pilot pawl 70 and a stop abutment 94 which is mounted upon the frame sidewall 16.

As best seen in FIG. 3, the belt unwinding rotation of the reel 24 induced by unwinding of belt 34 therefrom during opening movement of the door will carry the blocking arm 86 in the clockwise direction of rotation to engage its offset end 92 with the angled end face 90 of the pilot pawl 70. Accordingly, as best seen in FIG. 3 the pilot pawl 70 is subjected to a frictional force acting thereagainst in the direction to oppose its upward lifting movement by the inertia ball 62. Accordingly, a predeterminedly greater level of retractor acceleration must be encountered before the inertia ball 62 will ride up the conical depression 66 and lift the pilot pawl 70 into its FIG. 2 position of engagement with the ratchet teeth 46. During initial rewinding rotation of the reel in the counterclockwise direction upon subsequent closing movement of the door, the blocking arm 86 will rotate therewith in the counterclockwise direction and into engagement with the stop abutment 94 as seen in FIG. 1. As the belt rewinding rotation continues, the spring arms 88 and 89 slip on the left-hand end of the reel shaft 26 so that the blocking arm remains at rest engaging the stop abutment 94. Thus, the range of rotary movement of the blocking arm 86 is limited to an arc of a few degrees.

Thus, it is seen that the invention provides a new and improved door mounted retractor in which a blocking arm frictionally drive coupled with the reel engages with the pilot pawl during belt unwinding reel rotation induced by opening movement of the door whereby the retractor blocking mechanism is desensitized and a much larger retractor acceleration must be experienced in order to lock up the belt reel.

It will be understood that the circumferential spacing between the angled end face 90 of the pilot pawl 70 and the stop abutment 94 will determine how much belt is unwound from the retractor before the blocking arm 86 is carried into engagement with the pilot pawl 70. Furthermore, it will be understood that it is desirable to maximize the extent of such belt unwinding permitted so that the pilot pawl will not be desensitized during the normal unwinding of the belt from the reel as occurs, for example, when the vehicle occupant might lean slightly forward in the seat to adjust his seating position. On the other hand, the amount of belt unwinding needed to engage the blocking arm with the pilot pawl should not be so great as to permit opening movement of the door to the extent of obtaining an acceleration level which would initiate the retractor locking sequence prior to the belt having sufficiently unwound to carry the blocking arm into desensitizing engagement with the pilot pawl. Thus, the extent of door opening movement or occupant movement resulting in desensitizing can be adjusted to the proper magnitude by adjusting the spacing of the stop abutment 94 relative to the pilot pawl 70.

I claim:

1. A seat belt retractor adapted for mounting on a vehicle door to wind and unwind the end of a belt having its other end mounted on the vehicle body inboard the occupant so that belt is unwound upon opening the door and rewound upon closing the door comprising:
   a frame;
   a reel rotatably mounted on the frame and having teeth carried thereby;
   a lock bar mounted on the frame for movement into locking engagement with the reel to block belt unwinding rotation of the reel;
   an inertia mass mounted on the frame and movable in response to acceleration;
   a pilot pawl supported by the inertia mass at a normal position spaced from the teeth and spaced from the lock bar, said pilot pawl being movable by the inertia mass in response to a predetermined rate of acceleration to engage one of the teeth so that belt unwinding reel rotation causes further movement of the pilot pawl to move the lock bar into locking engagement with the reel, and thereby block belt unwinding rotation of the reel; and a blocking member friction drive coupled to the reel for rotation therewith and frictionally engaging with the pilot pawl upon unwinding rotation of the belt reel indicative of door opening movement to thereby impose a frictional force upon the pilot pawl resisting movement of the pilot pawl into engagement with the teeth by the inertia mass in response to occurrence of the level of acceleration induced by opening movement of the door, said frictional force being overcome upon occurence of a relatively greater level of acceleration acting on the inertia mass to thereby block the reel against further belt unwinding rotation.

2. A seat belt retractor adapted for mounting on a vehicle door to wind and unwind the end of a belt having its other end mounted on the vehicle body inboard the occupant so that belt is unwound upon opening the door and rewound upon closing the door comprising:

a frame;

a reel rotatably mounted on the frame and having teeth carried thereby;

a lock bar mounted on the frame for movement into locking engagement with the reel to block belt unwinding rotation of the reel;

an inertia mass mounted on the frame and movable in response to an acceleration condition;

a pilot pawl pivotally mounted on the frame and supported by the inertia mass at a normal position spaced from the teeth and spaced from the lock bar, said pilot pawl having an angle end face, said pilot pawl being movable by the inertia mass in response to a predetermined rate of acceleration to engage one of the teeth carried by the reel so that belt unwinding reel rotation causes further movement of the pilot pawl to move the lock bar into locking engagement with the reel and thereby block bolt unwinding rotation of the reel; and a blocking member friction drive coupled to the reel for rotation therewith and having an angled end face frictionally engageable with the angled end face of the pilot pawl upon unwinding rotation of the belt reel indicative of door opening movement so that the blocking member imposes a frictional force upon the pilot pawl resisting movement of the pilot pawl into engagement with the teeth carried by the reel in response to an occurrence of the level of acceleration induced by door opening movement which would otherwise cause the inertia mass to move the pilot pawl so that the retractor is inhibited from locking unwinding of the belt during opening movement of the door; said frictional force being overcome upon occurrence of a relatively greater level of acceleration acting on the inertia mass to thereby block the reel against further belt unwinding rotation.

* * * * *